US008250151B2

(12) United States Patent
Zimman et al.

(10) Patent No.: US 8,250,151 B2
(45) Date of Patent: Aug. 21, 2012

(54) SYSTEM AND METHOD FOR PROVIDING SECURE DATA TRANSMISSION

(75) Inventors: Christopher William Zimman, New York, NY (US); James William Hook, New York, NY (US); Dharmender Dulai, Brooklyn, NY (US)

(73) Assignee: Bloomberg Finance L.P., New York, NY (US)

( * ) Notice: Subject to any disclaimer, the term of this patent is extended or adjusted under 35 U.S.C. 154(b) by 472 days.

(21) Appl. No.: 11/249,846

(22) Filed: Oct. 12, 2005

(65) Prior Publication Data

US 2007/0083604 A1 Apr. 12, 2007

(51) Int. Cl.
*G06F 15/16* (2006.01)
(52) U.S. Cl. ....................................... 709/206; 709/203
(58) Field of Classification Search ........... 709/203–207
See application file for complete search history.

(56) References Cited

U.S. PATENT DOCUMENTS

| 5,406,624 | A | 4/1995 | Tulpan |
| 5,748,888 | A | 5/1998 | Angelo et al. |
| 5,809,143 | A | 9/1998 | Hughes |
| 5,822,435 | A | 10/1998 | Boebert et al. |
| 5,949,882 | A | 9/1999 | Angelo |
| 6,006,328 | A | 12/1999 | Drake |
| 6,055,575 | A | 4/2000 | Paulsen et al. |
| 6,134,661 | A | 10/2000 | Topp |
| 6,581,162 | B1 | 6/2003 | Angelo et al. |
| 7,496,347 | B2 * | 2/2009 | Puranik .......................... 455/410 |
| 2001/0005884 | A1 * | 6/2001 | Serada ........................... 713/153 |
| 2001/0039589 | A1 * | 11/2001 | Aho et al. ...................... 709/230 |
| 2002/0029340 | A1 | 3/2002 | Pensak et al. |
| 2002/0174180 | A1 * | 11/2002 | Brown et al. .................. 709/203 |
| 2003/0044013 | A1 | 3/2003 | Mukogawa |
| 2003/0163569 | A1 | 8/2003 | Panasyuk et al. |
| 2003/0200322 | A1 * | 10/2003 | Childs et al. .................. 709/229 |
| 2003/0223586 | A1 | 12/2003 | Green et al. |
| 2004/0013269 | A1 | 1/2004 | Du et al. |
| 2004/0024710 | A1 | 2/2004 | Fernando et al. |

(Continued)

FOREIGN PATENT DOCUMENTS

WO WO 96/30840 10/1996

(Continued)

OTHER PUBLICATIONS

Supplemental European Search Report, Nov. 30, 2009, 2 pgs.

*Primary Examiner* — Jason Recek
(74) *Attorney, Agent, or Firm* — Frank J. DeRosa; Richard F. Kurz; Frommer Lawrence & Haug LLP

(57) ABSTRACT

A system and method are provided, embodiments of which comprise encrypting input data based on authorization from an application program launched on a local computer device by a user. The encrypted input data that is generated by the user is sent to a network communication interface associated with the local computer device for transmission to a remote computer device. At the remote computer the received input data is decrypted, whereby based on the decrypted input data the remote computer generates encrypted response data that is associated with the decrypted first data. The encrypted response data is sent from the remote computer to the local computer, where the encrypted response data is received via the network communication interface associated with the local computer and decrypted. The local computer displays the decrypted response data on a display.

34 Claims, 13 Drawing Sheets

U.S. PATENT DOCUMENTS

| | | |
|---|---|---|
| 2004/0136530 A1 | 7/2004 | Endo et al. |
| 2005/0021949 A1* | 1/2005 | Izawa et al. .................... 713/165 |
| 2005/0033958 A1* | 2/2005 | Connell ......................... 713/156 |
| 2005/0049978 A1* | 3/2005 | Kleen ............................. 705/72 |
| 2005/0086304 A1* | 4/2005 | Naick et al. .................... 709/205 |
| 2005/0136990 A1* | 6/2005 | Hardacker et al. ............ 455/572 |
| 2005/0210273 A1* | 9/2005 | Gersten et al. ................ 713/189 |
| 2005/0222925 A1* | 10/2005 | Jamieson ........................ 705/35 |
| 2005/0240998 A1* | 10/2005 | Cromer et al. .................. 726/22 |
| 2005/0260993 A1* | 11/2005 | Lovell, Jr. ..................... 455/445 |
| 2006/0184791 A1* | 8/2006 | Schain et al. .................. 713/164 |
| 2008/0133032 A1* | 6/2008 | Arima et al. .................... 700/79 |
| 2008/0155108 A1* | 6/2008 | Morris ........................... 709/228 |

FOREIGN PATENT DOCUMENTS

| | | |
|---|---|---|
| WO | WO 98/19243 | 5/1998 |
| WO | WO 00/17758 | 3/2000 |
| WO | WO 01/10079 A1 | 2/2001 |
| WO | WO 02/01520 A1 | 1/2002 |
| WO | WO 02/01522 A1 | 1/2002 |

\* cited by examiner

SYSTEM AND METHOD FOR PROVIDING SECURE DATA TRANSMISSION

COPYRIGHT AND LEGAL NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

The present invention relates generally to a system and method for switching communication paths to match desired modes of communication, and more particularly, to provide secure or non-secure communication paths based on whether secure or non-secure communication is requested.

SUMMARY OF THE INVENTION

According to an embodiment of the present invention, a method for communicating data is provided. The method may comprise receiving data from one or more input devices and transmitting the data to a first computer, if a first indication that a first communication mode has been selected has been received from the first computer. The data may be transmitted to a second computer, if a second indication that a second communication mode has been selected has been received from the first computer.

According to another embodiment of the present invention, the first computer may send the first indication in response to a user activating the first application program at the first computer, whereby the first computer may send the second indication in response to the user activating a second application program at the first computer.

According to another embodiment of the present invention, a reply to the transmitted data may be received from the second computer, if the second indication has been received from the first computer. The received reply may be transmitted to the first computer, if the second indication has been received from the first computer.

According to another embodiment of the present invention, transmitting the data to a second computer may comprise transmitting the data to a second computer using a network interface of the first computer, and receiving a reply comprises receiving a reply to the transmitted input data from the second computer using the network interface of the first computer.

According to another embodiment of the present invention, transmitting the input data to a second computer may comprise encrypting the data, and transmitting the encrypted data to the second computer.

According to another embodiment of the present invention, the reply received from the second computer may be encrypted. Also, transmitting the received reply to the first computer may comprise decrypting the received reply, and transmitting the decrypted received reply to the first computer.

According to another embodiment of the present invention, a system for communicating data comprising at least a first computer may be programmed to receive data from one or more input devices and transmit the data to a second computer, if a first indication that a first communication mode has been selected has been received from the second computer. Data may be transmitted to a third computer, if a second indication that a second communication mode has been selected has been received from the second computer.

According to another embodiment of the present invention, the second computer may send the first indication in response to a user activating the first application program at the second computer; and the second computer may send the second indication in response to the user activating a second application program at the second computer.

According to another embodiment of the present invention, the first computer may be programmed to receive a reply to the transmitted data from the third computer, if the second indication has been received from the second computer. The received reply may be transmitted to the second computer, if the second indication has been received from the second computer.

According to another embodiment of the present invention, the first computer is programmed to transmit the data to the third computer using a network interface of the second computer. The transmitted data is received from the third computer using the network interface of the second computer.

According to another embodiment of the present invention, the first computer is programmed so that transmitting the data to a third computer may comprise encrypting the data, and transmitting the encrypted data to the third computer.

According to another embodiment of the present invention, the reply received from the third computer is encrypted, and the first computer is programmed so that transmitting the received reply to the second computer may comprise decrypting the received reply; and transmitting the decrypted received reply to the second computer.

According to another embodiment of the present invention, a method of providing data communication over a communication network using a encryption device is provided. The method may comprise encrypting first data based on the encryption device authenticating a user, where the encrypted first data may be sent from the encryption device to an interface associated with a first computer for transmission to a second computer. At the second computer, the encrypted first data may be decrypted and encrypted second data may be generated in response to the decrypted first data. The generated encrypted second data may be sent to the interface associated with the first computer for transmission to the encryption device, where at the encryption device the sent encrypted second data received via the interface associated with the first computer may be decrypted. The first computer may perform an operation based on the decrypted second data.

According to another embodiment of the present invention, authenticating the user may comprise launching an application program for beginning an authentication process.

According to another embodiment of the present invention, the authentication process may comprise the launched application program providing connection status between the encryption device and the first computer.

According to another embodiment of the present invention, the authentication process may comprise scanning and detecting a finger print pattern associated with the user upon receiving a prompt generated by the application program.

According to another embodiment of the present invention, the decrypted second data may comprise display data generated in response to the first data processed by the second computer device.

According to another embodiment of the present invention, the interface may comprise a universal serial bus (USB) interface and a network interface.

According to another embodiment of the present invention, the first data may be generated by a keyboard device, a mouse device, and/or a peripheral device.

According to another embodiment of the present invention, a method of data communication between a first and a second computer over a communication network using an encryption device coupled to the first computer is provided. The method may comprise encrypting first data at the encryption device based on an application program associated with the data communication being active, where the encrypted first data may be sent from the encryption device to an interface associated with the first computer for transmission to the second computer. At the second computer the encrypted first data may be decrypted and encrypted second data may be generated in response to the decrypted first data, where the generated encrypted second data may be sent to the interface associated with the first computer for transmission to the encryption device. At the encryption device, the sent encrypted second data received via the interface associated with the first computer may be decrypted, where the encryption device may provide the decrypted second data to the first computer for disposition by the first computer.

According to another embodiment of the present invention, the first data may be generated by a keyboard device, a mouse device, and/or a peripheral device.

According to another embodiment of the present invention, the application program may reside on the first computer and communicates with a second application program residing on the second computer. The second application may generate the second data and the application program at the first computer may display the decrypted second data.

According to another embodiment of the present invention, the application program may reside on the encryption device and may communicate with a second application program, where the second application may generate the second data and the application program at the encryption device may display the decrypted second data.

According to another embodiment of the present invention, wherein the communication network may comprise the Internet.

According to another embodiment of the present invention, encrypting first data may comprise encrypting first data at the encryption device based on a window associated with the application program being in-focus.

According to another embodiment of the present invention, a secure system for generating secure data transmission over a communication network between a first computer and a second computer is provided. The device may comprise a switch device adapted to receive first data from one or more input devices; an encryption device adapted to receive the first data routed from the switch device for encrypting the received first data based on an application program associated with the secure data transmission being active; an interface associated with the first computer adapted to receive the encrypted first data for transmission over the communication network to the second computer, where the second computer may receive the encrypted first data and generates encrypted second data; and a display device associated with the first computer. The encrypted second data generated at the second computer may be received by the interface from the communication network and sent to the switch for routing, where the switch may route the encrypted second data to the encryption device for decrypting the encrypted second data. The switch may route the decrypted second data from the encryption device to the first computer for display on the display device.

According to another embodiment of the present invention, the interface may comprise a network interface According to another embodiment of the present invention, a biometric authentication device may be in communication with the application program that prompts a user for performing an authentication process. The encryption device may authenticate the user prior to encrypting the input data.

According to another embodiment of the present invention, the biometric authentication device may comprise a fingerprint scanner.

According to another embodiment of the present invention, the switch device may comprise a USB controller for providing data switching between the one or more input devices, the first computer, and the encryption device.

According to another embodiment of the present invention, a method provides security to an application in communication with a server computer that receives input from an input device operating with a client computer and displays information on a display device operating with the client computer. The method may comprise encrypting data relating to the application entered via the input device without providing the entered, unencrypted data to the client computer. The encrypted data is transmitted over a network to the server computer, where the encrypted data transmitted to the server computer is decrypted. The server computer may operate on the decrypted data and may provide data for display at the client computer. The data provided by the server computer may be transmitted for display on the display device of the client computer, where the display device may display the transmitted data provided by the server computer.

According to another embodiment of the present invention, the data provided by the server computer may be encrypted prior to transmitting such data to the client computer, and such data may be decrypted after transmission and prior to display. The decrypted data may be displayed on the display device of the client computer.

According to another embodiment of the present invention, encrypted data transmitted to the client computer may be decrypted independently of the client computer and such decrypted data may be provided to the client computer for display on the display device.

According to another embodiment of the present invention, the input device may comprise a keyboard, and/or a pointing device.

According to another embodiment of the present invention, a method is provided for a client computer to interact with a plurality of applications and to provide security to at least one application of the one or more applications which communicates with a server computer that receives input from an input device operating with the client computer. The method may comprise the following steps. If the at least one application includes a window in focus at the client computer, data relating to the at least one application entered via the input device may be encrypted without providing the entered, unencrypted data to the client computer. The encrypted data may be transmitted over a network to the server computer, where the encrypted data transmitted to the server computer may be decrypted. The server computer operates on the decrypted data and may provide data to be operated on by the client computer. The provided data may be transmitted to the client computer, where the client computer may operate on provided data. If the at least one application does not include a window in focus at the client computer, data entered via the input device may be provided to the client computer without encryption for disposition by the client computer.

According to another embodiment of the present invention, data relating to the selected application in a device coupled to the input device and the client computer may be encrypted.

According to another embodiment of the present invention, an output of the keyboard may be coupled to an output of the device that is coupled to the client computer for operation with the at least one active application when the window associated with the at least one active application is in focus.

According to another embodiment of the present invention, the output of the keyboard may be automatically coupled to the output of the device that is coupled to the client computer when the window associated with at least one active application is in focus.

BRIEF DESCRIPTION OF DRAWINGS

The invention is illustrated in the figures of the accompanying drawings, which are meant to be exemplary and not limiting, and in which like references are intended to refer to like or corresponding parts.

DETAILED DESCRIPTION

Figure 1:
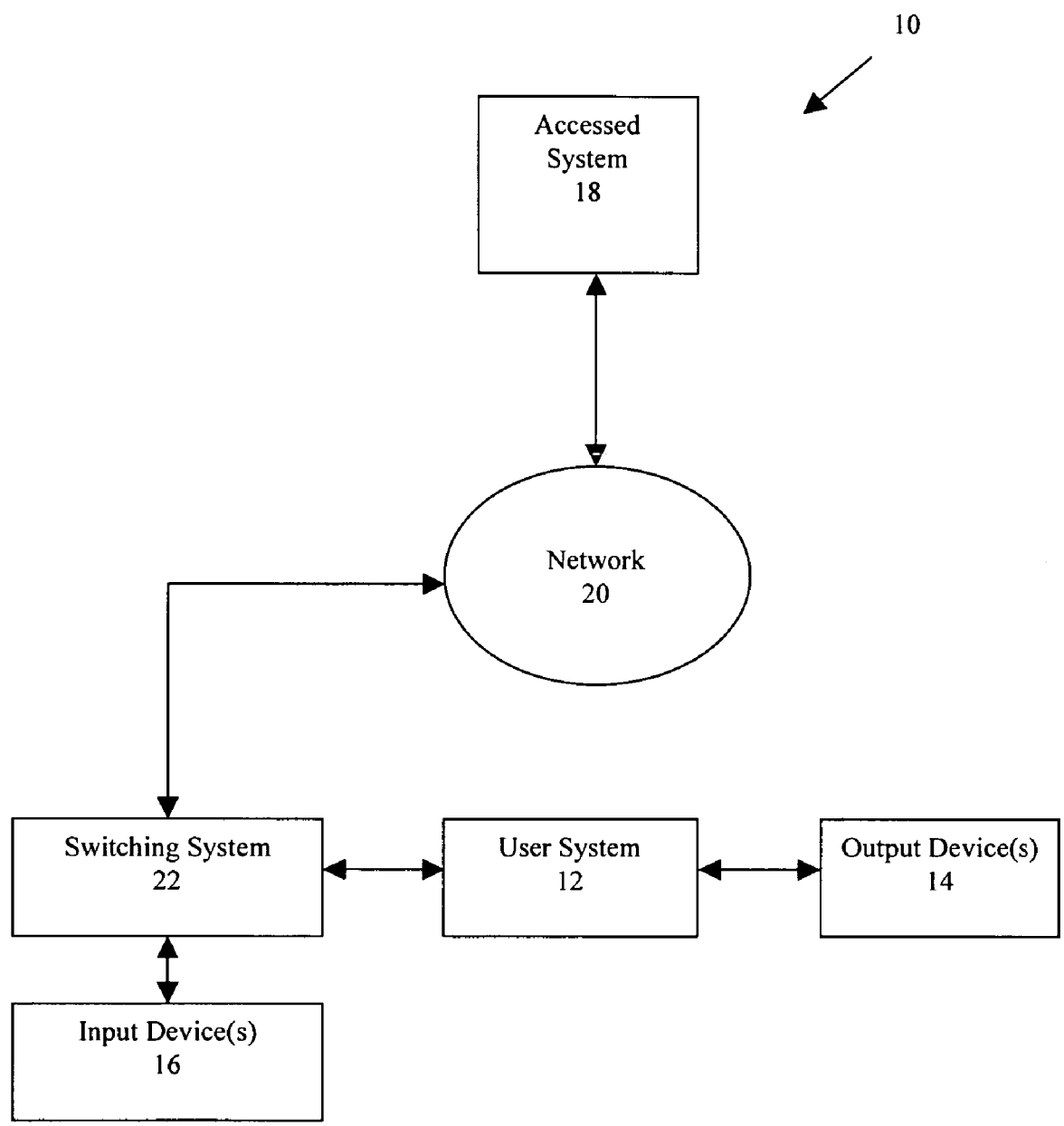
FIG. 1 is a block diagram illustrating a data communication system according to an embodiment of the present invention.

FIG. 1 illustrates a data communication system 10 according to an embodiment of the present invention. Data communication system 10 comprises a User Computer 12, a computer 18 that is to be accessed (also referred to as "Accessed Computer"), a Network 20, and a Switching System 22.

User Computer 12 may include any computer that may be operated by a user. In an embodiment of the invention, User Computer 12 is also capable of receiving and acting upon data from other computers. For example, User Computer 12 may include a PC, a workstation, or a PDA, capable of receiving and displaying data received from a server. Associated with User Computer 12 may be one or more output devices 14 for providing output to a user, e.g., a display or a printer. Also, one or more data input devices 16, such a mouse and/or a keyboard, may be in communication with User Computer 12 through Switching System 22.

In an embodiment of the invention, User Computer 12 also includes functionality for indicating to Switching System 22 that one of a plurality of communication modes is desired. Each communication mode may be characterized by, for example, a different communication destination, such as a different computer at the receiving end of the communication. For example, where User Computer 12 is capable of simultaneously running more than one application program, User Computer 12 may provide an indication to Switching System 22 that a first, a second, or a third communication mode is desired based on whether an application program from a first, a second, or a third set of application programs, respectively, is active. For example, an active application program may include an application program window which is in-focus.

Accessed Computer 18 may include any computer that may communicate with other computers. For example, Accessed Computer 18 may include a computer server capable of communicating with clients through a network. If desired, Accessed Computer 18 may communicate with other computers in a secure manner, e.g., using encryption and decryption.

Accessed Computer 18 is in communication with Switching System 22 through Network 20. Network here is used broadly to include any communication path through which computer systems may communicate, including, but not limited to, one or more of the following: private, dedicated telecommunication lines, wired or wireless LANs and WANs, and the Internet.

Figure 2:
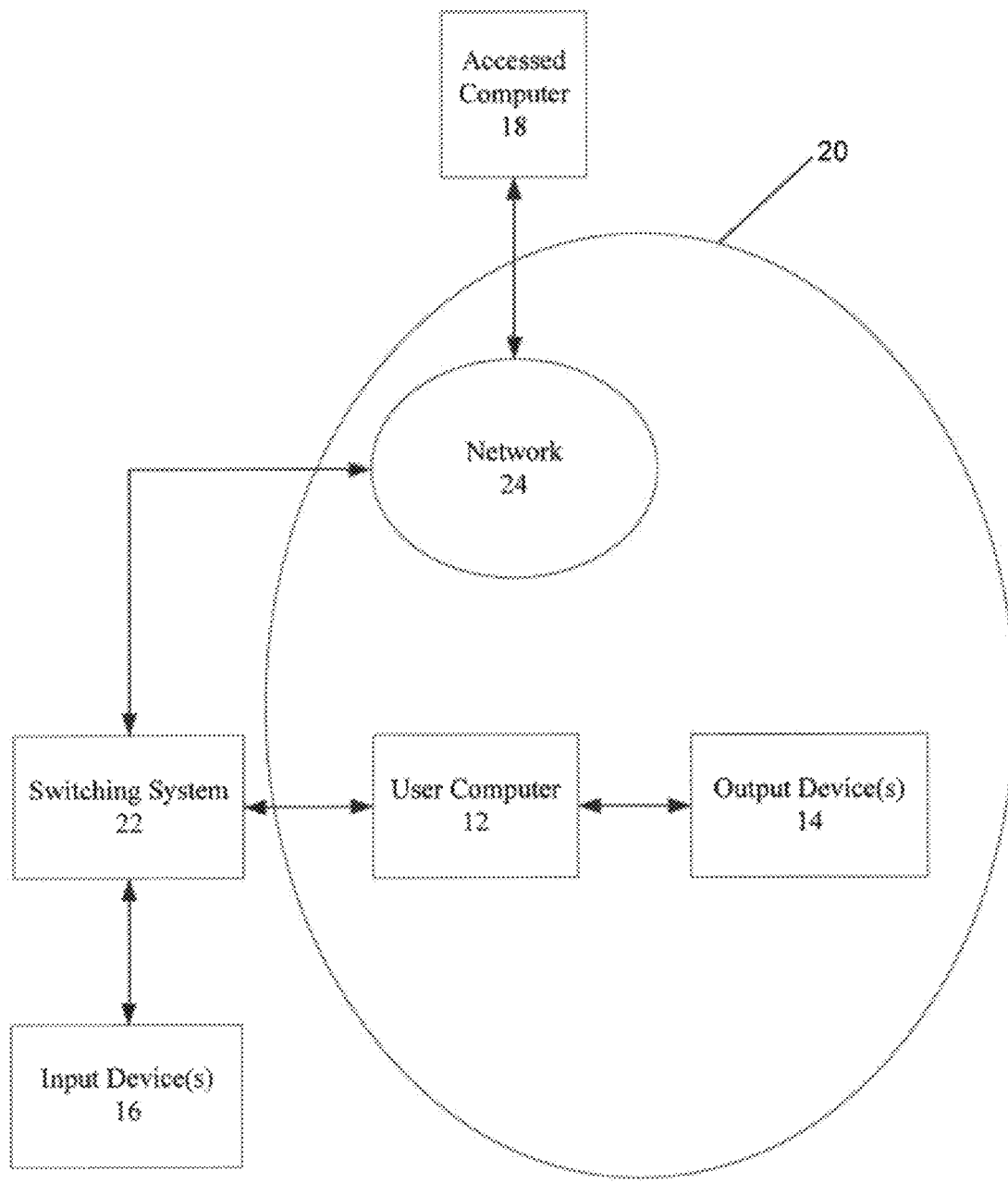
FIG. 2 is a block diagram illustrating the data communication system comprising a switching system according to an embodiment of the present invention.

In addition, the network through which Switching System 22 communicates with Accessed Computer 18 may include User Computer 12. For example, as shown in FIG. 2 and described further below, Switching System 22 may be in communication with Accessed Computer 18 via User Computer 12 and a network that provides a communication path between User Computer 12 and Accessed Computer 18, e.g., Network 24. Communication path is used broadly here to refer to a physical communication path, a logical communication path, or combinations thereof.

Switching System 22 provides communication paths between input device(s) 16 and User Computer 12 and between input devices 16 and Accessed Computer 18 (via Network 20). Switching System 22 functions to (a) dynamically switch input device(s) 16 between these communication paths based on indication of which one of a plurality of communication modes is desired, and (b) transmit data from input device(s) 16 to the computer system at the receiving end of the active communication path.

As mentioned previously, Switching System 22 may receive the indication of which one of a plurality of communication modes is desired from User Computer 12. For example, User Computer 12 may send an indication to Switching System 22 that a first communication mode is desired based on an application from a first set of applications being active and, upon receiving this indication, Switching System 22 may cause the communication path between input device(s) 16 and User Computer 12 to be active. Where User Computer 12 sends an indication to Switching System 22 that a second communication mode is desired based on an application from a second set of applications being active, Switching System 22 may cause the communication path between input device(s) 16 and Accessed Computer 18 to become active.

According to an embodiment of the invention, in a communication mode where the communication path between input device(s) 16 and Accessed Computer 18 is active, Switching System 22 may also function to receive data from Accessed Computer 18 and forward the received data to User Computer 12. For instance, continuing with the above example where User Computer 12 sends an indication for a second communication mode based on an application from a second set of applications being active, Switching System 22 may transmit data from input device(s) 16 to Accessed Computer 18 which processes the data and sends a reply back to Switching System 22. Switching System 22 may then transmit the reply to User Computer 12, e.g., to the application from the second set of applications that is active, for action, e.g., display to the user.

If desired, Switching System 22 may communicate with other computer systems in a secure manner, e.g., using encryption and decryption. Thus, in the previous example, Switching System 22 may encrypt the data from input device(s) 16 before transmitting it to Accessed Computer 18 over Network 20. Accessed Computer 18 may then decrypt the data, process it, and transmit an encrypted reply back to Switching System 22. Switching System 22 may then decrypt this reply prior to transmitting it to User Computer 12.

Switching System 22 may include any computer system capable of performing the functions described above. These functions may be implemented through hardware or software or combinations thereof. Examples of different embodiments of Switching System 22 and components that may perform the functions above are described further below.

Although FIGS. 1 and 2 show only a single Accessed Computer 18, any number of such systems may be accommodated within the invention with Switching System 22 dynamically switching input device(s) 16 between communications paths to each in a similar manner as described above. For example, five communication modes may correspond to communication paths between input device(s) 16 and five different communication destinations, such as User Computer 12 and four different Accessed Computers, respectively.

Computer here is used broadly to mean computer hardware and software or computer software only. For example, the four Accessed Computers mentioned above may all be separate server applications co-resident on the same hardware platform.

The embodiments of the invention described above may be advantageous in situations where a user wishes to access a computer, e.g., Accessed Computer 18, but the user's computer, e.g., User Computer 12, is not a trusted computer. For example, the user's computer may be vulnerable to outside attacks, such as from viruses, where data input to the computer, such as keystrokes, may be monitored and transmitted to a third-party. In such a case, according to the embodiments of the invention described above, when the user attempts to access Accessed Computer 18 through, for example, a corresponding client application on User Computer 12, Switching System 22 may direct data from input device(s) 16 to Accessed Computer 18 for processing and send the reply received from Accessed Computer 18 to the client application on User Computer 12 for action, e.g., display to the user. Thus, in such a case, data input from the user meant for the computer to be accessed is not sent through the user's computer and would not be vulnerable to the attacks mentioned above.

As mentioned above, Accessed Computer 18 may communicate with other computers in a secure manner, e.g., using encryption and decryption. For example, Accessed System 18 and User Computer 12 may communicate securely using the Transport Layer Security (TLS) protocol.

Figure 3:
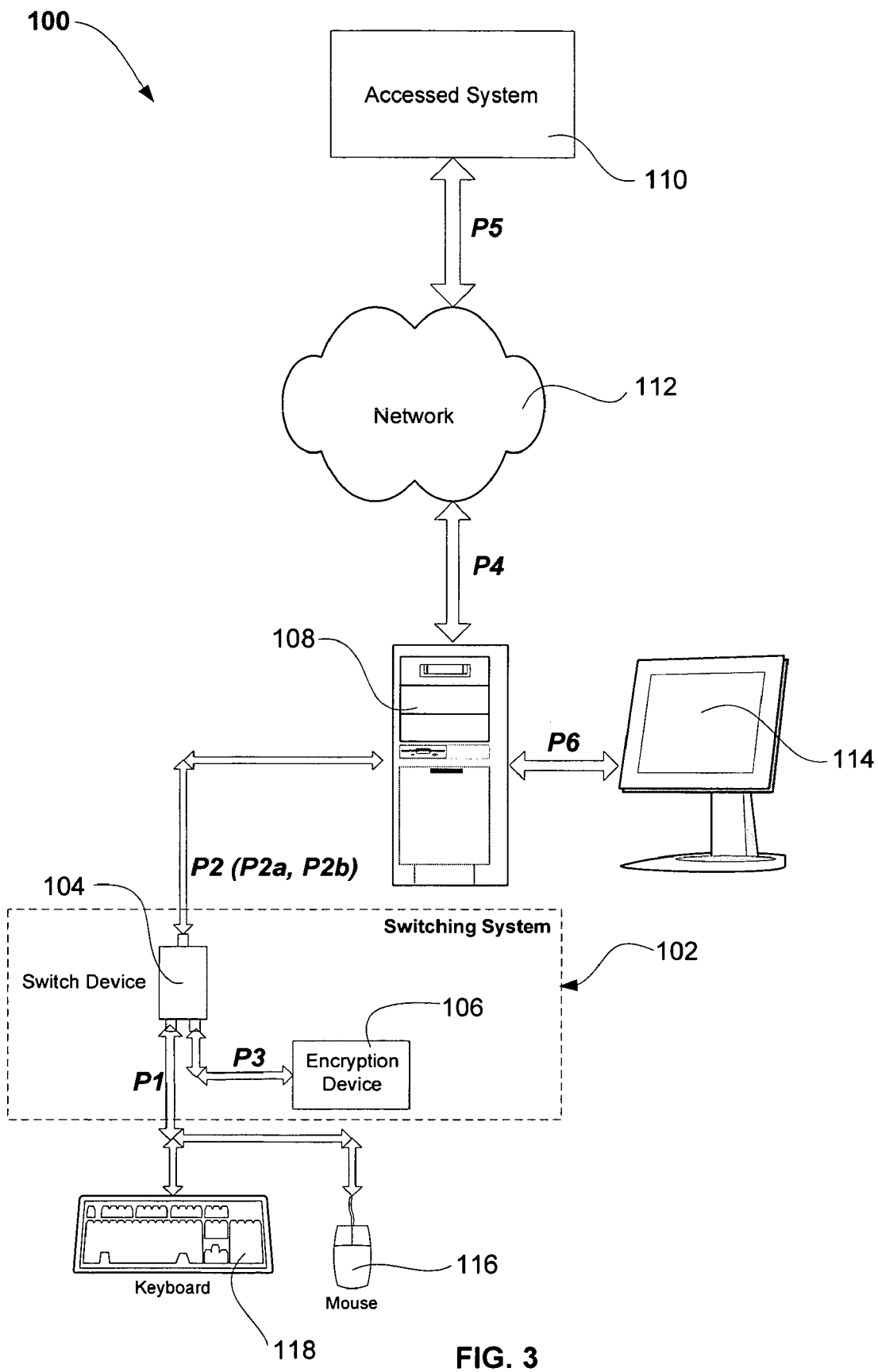
FIG. 3 is a schematic diagram illustrating the secure transmission path of the data communication system according to an embodiment of the present invention.

FIG. 3 illustrates a data communication system according to an embodiment of the invention that provides for secure communication. Secure data communication system 100 comprises a Switching System 102, as described previously. As shown in the embodiment of FIG. 3, Switching System 102 includes a data switch device 104 and an encryption device 106. Secure communication system 100 also comprises a User Computer 108 and an Accessed Computer 110, as described above. As shown in FIG. 3, User Computer 108 is in communication with Accessed Computer 110 via Network 112. In the embodiment of FIG. 3, a display device 114 is associated with User Computer 108, and one or more data input devices such a mouse 116 and/or a keyboard 118. According to the embodiment of FIG. 3, the Accessed Computer 110 may include one or more server computers.

Other devices that provide input data may alternatively be utilized. For example, in addition to, or in place of, keyboard 116 and mouse 118, data may be input using a touch screen display, a voice recognition system, and/or another peripheral device capable of providing input data.

Data communication between the various components of system 100 are designated along communication paths P1, P2, P3, P4, and P5, each of which may include physical or logical communication paths, or combinations thereof, as mentioned previously. Each path may employ different communications media, such as fiber optic media, wireless means (e.g., radio frequency and infrared), or cable based data transfer medium.

According to the embodiment of FIG. 3, path P2 is a physical communication path that includes at least two logical communication paths (e.g., P2a and P2b). As described further below, path P2a carries data between Switching System 102 and User Computer 108 for local processing (e.g., by programs running on User Computer 108). As described further below, path P2b carries data between Switching System 102 and User Computer 108 for transfer (e.g., using a network interface of User Computer 108 to communicate over Network 112) to and from Accessed Computer 110.

Input data that is received from mouse 116 and keyboard 118 is sent along path P1 to data switch device 104. Switch device 104 determines whether or not the data is to be switched along path P3 to encryption device 106. If a secure mode communication session is established, input data may be routed to the encryption device 106 via paths P1 and P3. Alternatively, if a secure mode communication session is not required, input data along path P1 may be switched along path P2a to User Computer 108 for local processing (e.g., by a program running on User Computer 108).

Display information that is generated by User Computer 108 is displayed on display device 114. The display information may be generated as a result of either programs running on User Computer 108 or as a result of data information received by User Computer 108 from Accessed Computer 110 over Network 112.

Data may be transmitted and received between User Computer 108 and Accessed Computer 110. For example, encrypted input data may be sent along paths P1 and P3 to encryption device 106. Following encryption, encrypted data is sent over paths P3 and P2b to User Computer 108, where the encrypted data is transmitted via network interface of User Computer 108 (not shown) along paths P4 and P5 to Accessed Computer 110. This is a secure mode of operation where the encrypted data is not processed locally by User Computer 108. Instead, it is sent to Accessed Computer 110 for processing, whereby Accessed Computer 110 may only proceed to process the encrypted data upon decryption.

Alternatively, for example, unencrypted input data may be sent over paths P1 and P2a to User Computer 108 for local processing. Following the processing of the unencrypted input data by User Computer 108, unencrypted data may be generated by program(s) running on User Computer 108 and sent through the network interface of User Computer 108 along paths P4 and P5 Accessed Computer 110. Also, the unencrypted input data processed locally at User Computer 108 may be displayed on display device 114. This is an un-secure mode of operation, where input data is directly processed by computer 108.

Data that is generated by the Accessed Computer 110 may be encrypted or not encrypted based on a user's requirements and needs for secure data transmission over Network 112. For example, unencrypted data received from Accessed Computer 110 that is addressed to a program running on User Computer 108 may be locally processed by User Computer 108 by the program to which the data is addressed. The unencrypted data received from Accessed Computer 110 and processed locally by User Computer 108, may then be displayed to the user on display device 114. Alternatively, for example, encrypted data that is generated by Accessed Computer 110 for eventual processing by User Computer 108 may be sent over paths P5 and P4 to User Computer 108. This encrypted data is addressed to Switching System 102. Consequently, when, the encrypted data is received by the network interface of User Computer 108, the encrypted data is transmitted along path P26 to Switching System 102 and switch device 104. At switch 104, the encrypted data is received and routed to the encryption device 106 over path P3, where the encrypted data is decrypted. Following this decryption process, the decrypted data is sent over path P3 to switch 104, where the decrypted data is routed over path P2a to User Computer 108. The decrypted data is then locally processed at User Computer 108 for the purpose of being displayed on display 114.

Figure 4A:
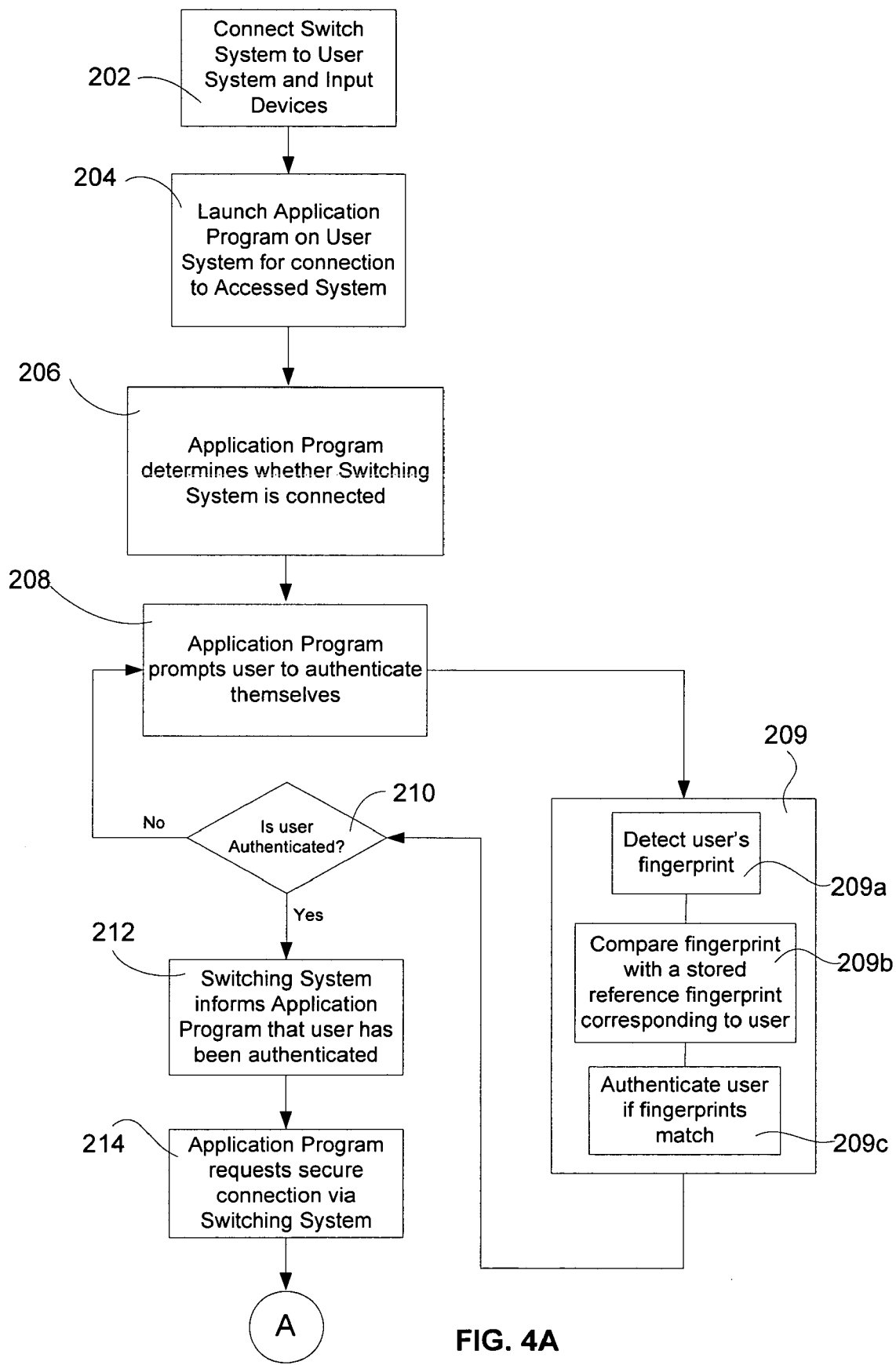
FIGS. 4A-4B are flowchart diagrams illustrating the operation of the switching system in a secure mode of operation according to an embodiment of the present invention.
Figure 4B:
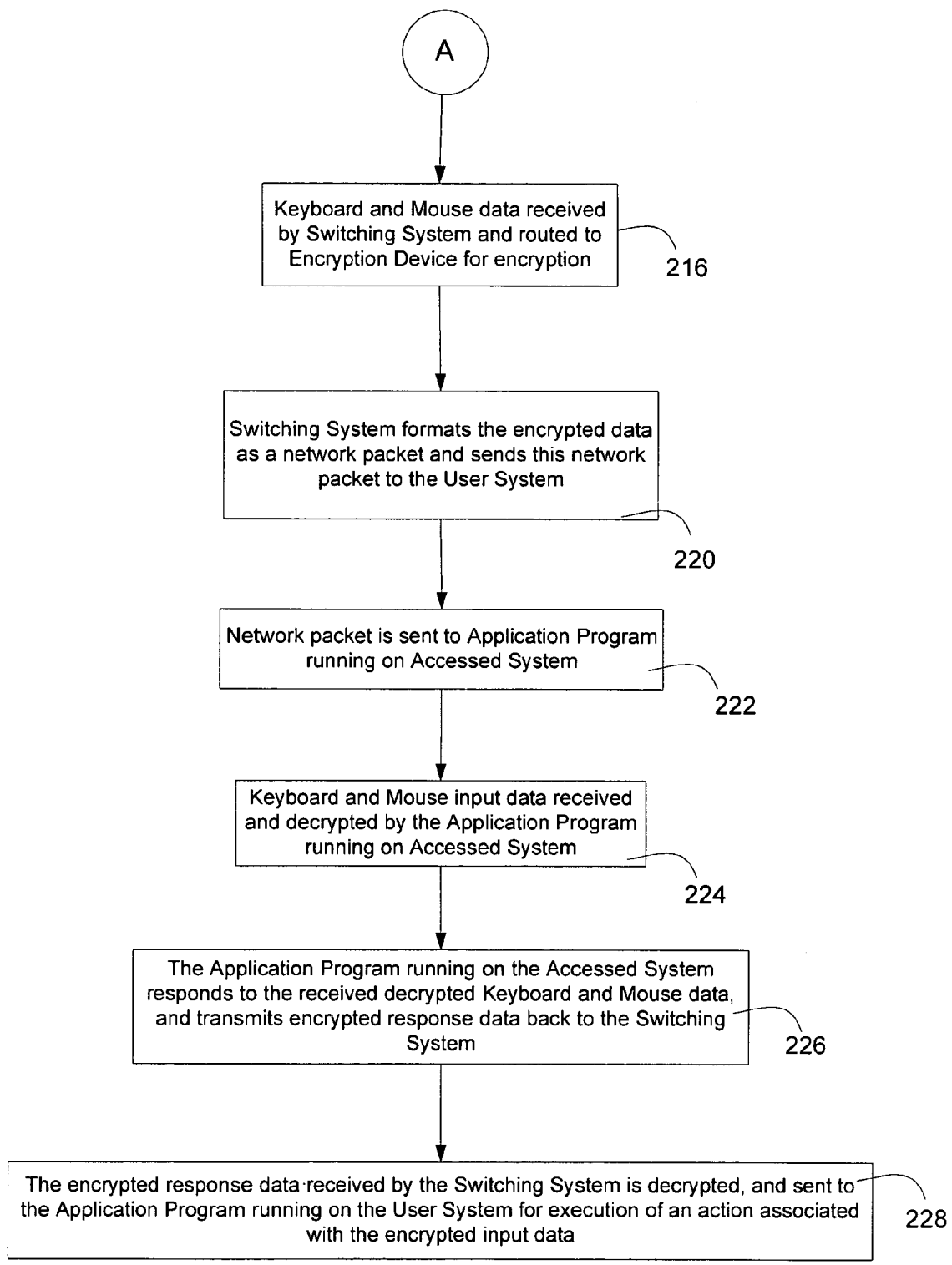

FIGS. 4A and 4B illustrate operational flow diagrams of the encryption mode of operation according to an embodiment of the invention. These flow diagrams are described in association with the secure data communication system 100 shown in FIG. 3. At step 202, encryption device 106 is connected to switch device 104 via a connector, wireless link, or other suitable coupling/communication means (not shown) to form Switching System 102. This may not be necessary if the encryption device 106 and the switch device 104 were previously integrated within a single unit. Switching System 102 may be connected between User Computer 108 and input devices 116 and 118 via Universal Serial Bus (USB) connections and/or other connectivity media and protocols. For example, input data from mouse 116 and keyboard 118 may be connected to Switching System 102 over a USB connection, as indicated by communication path P1. Similarly, connectivity between Switching System 102 and User Computer 108 also may occur over a USB connection as indicated by communication path P2. If the encryption device 106 is a removable device that attaches to switch 104, it may incorporate a variety of connectors for establishing connectivity. Once attached, encryption device 106 exchanges data between switch 104 over communications path P3.

At step 204, once Switching System 102 is connected between the input devices 116 and 118 and User Computer 108 (step 202), the user may launch an application program on User Computer 108 for providing secure data communication between the user of User Computer 108 and the Accessed Computer 110. Once the application program is launched (step 204), at step 206 the application program communicates with the switch device 104 and encryption device 106 in order to initiate an authentication process, described further below. The authentication process begins a secure encrypted data communication session between User Computer 108 and Accessed Computer 110 via Switching System 102 upon authentication of the user.

At step 206, the application program running on User Computer 108 determines whether Switching System 102 is connected to User Computer 108. If the Switching System 102 is connected to User Computer 108, at step 208 the application program prompts the user (e.g., on display device 114) to perform the authentication process using Switching System 102. Switching System 102 may include a display that prompts the user to initiate the authentication process. For example, in addition to the application program (on User Computer 108) prompting the user via display 114, the Switching System 102 may incorporate a display that prompts the user to place their forefinger on a fingerprint detection pad in communication with or incorporated within the Switching System 102. The Switching System will then determine whether the user is an authorized user based on a scanned fingerprint. This authentication process is illustrated in steps 209a, 209b and 209c. Once the fingerprint is detected (step 209a), it is compared, in step 209b, with a stored reference fingerprint that is associated with the designated user of the Switching System 102 (e.g., the user authorized to use the device). If there is a match between the scanned and reference fingerprint, the Switching System 102 authenticates the user (step 209c). If at step 210 it is determined that the user has been successfully authenticated (e.g., fingerprint detection), at step 212 Switching System 102 communicates with, and informs the application program running on User Computer 108 that the user has been authenticated. If at step 210 it is determined that the user has not been authenticated, the application program running on User Computer 108 will continue to prompt the user to proceed with the authentication process using the Switching System 102, as indicated by steps 208 and 209.

Other authentication means may be incorporated into the Switching System 102 in addition to or as an alternative to the biometric means described above. For example, within the Switching System 102, a password protected and/or personal identification code (PIN) code entry capability may be used.

Once the application program running on User Computer 108 receives confirmation by Switching System 102 that the user has been authenticated, at step 214 the application program communicates a request for secure data transmission to Switching System 102.

After this request has been received by Switching System 102, then, as shown in FIG. 4B at step 216, data input received from the mouse 116 and the keyboard 118 at Switching System 102 is routed to the encryption device 106 for encryption via switch 104 and communication paths P1 and P3. In this way, input data is restricted from reaching User Computer 108 without being encrypted when a secure communication session is being used.

At step 220, the Switching System 102 sends the encrypted data to User Computer 108 via a Universal Serial Bus (USB) connector for forwarding to the Accessed Computer 110. For example, the encryption device 106 may format the encrypted data into a network packet according to a network protocol recognized by the network interface of User Computer 108 and Accessed Computer 110 (e.g., Ethernet) and address this network packet to the Access Computer 110. The network packet is then routed by switch 104 to User Computer 108 along communication paths P3 and P2b. Although connectivity between the switch 104 incorporated within Switching System 102 and User Computer 108 is established by USB, other physical connectors and transmission protocols may also be utilized for coupling data between the Switching System 102 and User Computer 108.

At step 222, the USB connection at User Computer 108 receives the network packet and, since the network packet is not addressed to User Computer 108, the network packet is given to the network interface of User Computer 108 for transmission over Network 112 to its addressed destination, e.g., the application program running on Accessed Computer 110.

At step 224, the application program running on Accessed Computer 110 to which the network packet is addressed receives, and processes the encrypted input data contained in the packet. The application program running on Accessed Computer 110 may be associated with the application program running on User Computer 108, whereby the application program running on Accessed Computer 110 processes the encrypted input data received from Switching System 102, and the application program running on User Computer 108 receives this processed data from Accessed Computer 110 and acts on it, (e.g., displays it).

Once Accessed Computer 110 receives the encrypted input data, the application program at Accessed Computer 110 decrypts this data. The input data may include a mouse click selecting an option on a displayed webpage associated with a remote web site run by the application program at Accessed Computer 110. The webpage may be locally accessed and displayed on display 114 associated with User Computer 108. The input data may also comprise keyboard data for entry into one or more fields of the accessed webpage. Generally, any data from a peripheral device that may exchange data with the web site or application program running on Accessed Computer 110 may constitute input data.

At step 226, the application program running on Accessed Computer 110 processes the decrypted input data. Based on the input data, this application program generates response data for use by the application program running on User Computer 108. For example, if the encrypted input data comprises a mouse click on a particular feature or option of the webpage associated with the web site running on Accessed Computer 110, the application program at Accessed Computer 110 processes the mouse click by generating webpage graphics associated with the user's selected option. Thus, the application program at Accessed Computer 110 responds to the input data by processing it and generating graphics associated with the input data. This response data (e.g., graphical data) is encrypted and transmitted over network 112 to Switching System 102 (via the network interface of User Computer 108) for eventual display processing by the application program running on User Computers 108. The encrypted response data is received by the network interface of User Computer 108 and since the data is addressed to Switching System 102, and not User Computer 108, the network interface passes the data to the USB port of User Computer 108 and on to Switching System 102, as indicated by communication paths P5, P4, and P2b.

At step 228, switch 104, which is incorporated within Switching System 102, routes the encrypted response data to encryption device 106. At the encryption device 106, the encrypted response data is decrypted and sent back to switch 104 (path P3). Switch 104 routes the decrypted response data to the USB connection of User Computer 108 along path P2 or, where the decrypted response data is processed by the application program running on User Computer 108. The application program then displays the decrypted response data on display device 114 (communication path P6).

The various steps illustrated in the embodiments of FIGS. 4A and 4B illustrate that during the encrypted mode of operation, generated input data is encrypted before being received by User Computer 108. This is illustrated by communication paths P1, P3, P2a. Thus, according to the embodiments shown in FIGS. 3, 4a and 4b, this encrypted data is not locally processed by User Computer 108. It is transmitted over a communication network to a remote secure site, e.g., Accessed Computer 110, for processing. At Accessed Computer 110, the data is decrypted and processed as shown by communication paths P4 and P5. Once processed, response data is generated, which is encrypted and transmitted back through User Computer 108 to Switching System 102. Only after decryption by Switching System 102 is the response data sent to User Computer 108 for display to the user. This ensures that the response data is sent from an authenticated source from which the user is expecting data. The User Computer 108 may only process the response data so far as to display the results of the processing carried out at another computer, e.g., Accessed Computers 110. This provides a secure bi-directional link, where processing is carried out at a secure site in direct response to securely transmitted input data.

The application program running on User Computer 108 may be downloaded to User Computer 108 from Accessed Computer 110 or be stored in and executed on User Computer 108 from a storage device within Switching System 102. Once downloaded, the application program may, for example, execute the authentication routine locally on User Computer 108. Alternatively, for example, the authentication routine executed by the application program may be accessed from Accessed Computer 110, rather than locally from User Computer 108. In accordance with another embodiment, the application program running on User Computer 108 may be accessed and run entirely from the encryption device 106.

Figure 5:
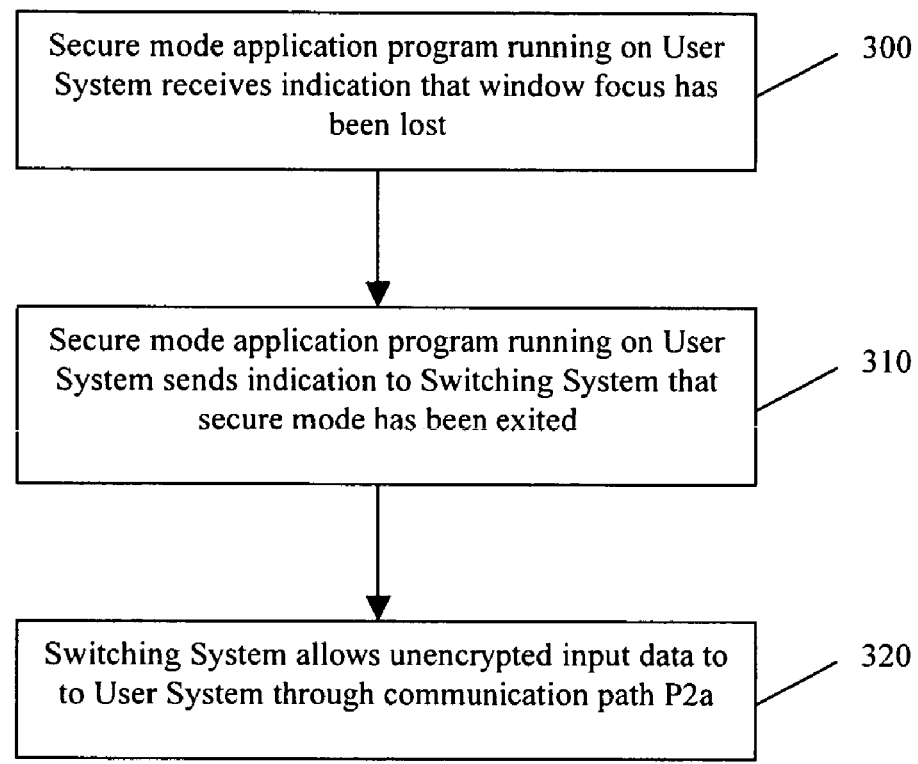
FIGS. 5, 6, 7, and 8 are flow diagrams illustrating a method by which the data communication system operates the secure mode application program and switching system based on the application program's window focus according to an embodiment of the present invention.

FIGS. 5 through 8 are flow diagrams showing the effects of different application programs running on User Computer 108 becoming active on the secure mode of operation according to an embodiment of the present invention. These effects are described with the aid of the embodiment illustrated in FIG. 3. During the secure mode operation of system 100, the application program running on User Computer 108 initially facilitates the authentication process prior to encrypted input data being transmitted to Accessed Computer 110 over Network 112. Following authentication, the secure mode application program running on User Computer 108 is the active application (e.g., as indicated by a window associated with this application program being shown as the active window, on display device 114. Subsequently, the window associated with this application program may or may not be "in-focus", (e.g., shown as the active window), based on whether the user at User Computer 108 has decided to work with a different application program that is running on User Computer 108. FIG. 5 is a flow diagram showing one way in which the data communication system of the invention may operate when the secure mode application program running on User Computer 108 stops being the active application. For example, after the secure mode application program has been launched and the user authenticated, the user may switch to work with another application program running on User Computer 108.

At step 300, the secure mode application program running on User Computer 108 receives an indication that window focus has been lost. For example, the secure mode application program may receive a notification from the operating system at User Computer 108 indicating that the application has lost window focus. Then, at step 310, the secure mode application program running on User Computer 108 sends an indication to Switching System 102 that secure mode has been exited. Consequently, at step 320, Switching System 102 allows input data to from input devices 116 and 118 to flow through communication path P2a to User Computer 108 unencrypted.

Figure 6:
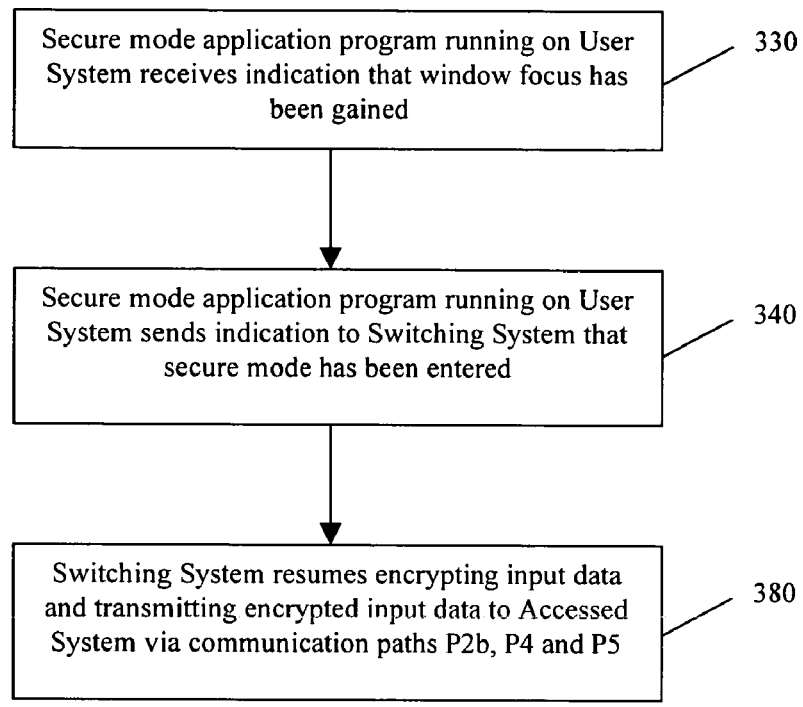

FIG. 6 is a flow diagram showing one way in which the data communication system of the invention may operate when the secure mode application program is resumed at User Computer 108. For example, after the secure mode application program has been launched and the user authenticated, the user may switch to work with another application program running on User Computer 108, causing the secure more application program to lose window focus and continue running in the background. Thereafter, the user at User Computer 108 may resume the secure mode application program by choosing to work with it again and causing it to become the active application program.

At step 330, the secure mode application program running on User Computer 108 receives an indication that window focus has been gained. For example, the secure mode application program may receive a notification from the operating system at User Computer 108 indicating that the application has gained window focus. Then, at step 340, the secure mode application program running on User Computer 108 sends an indication to Switching System 102 that secure mode has been entered. Consequently, at step 380, Switching System 102 routes input data from input devices 116 and 118 to encryption device 106 for encryption and then sends the encrypted input data up through communication path P2*b* to the User Computer 108 for transmission to Accessed Computer 110 over communication paths P4 and P4 and Network 112.

Figure 7:
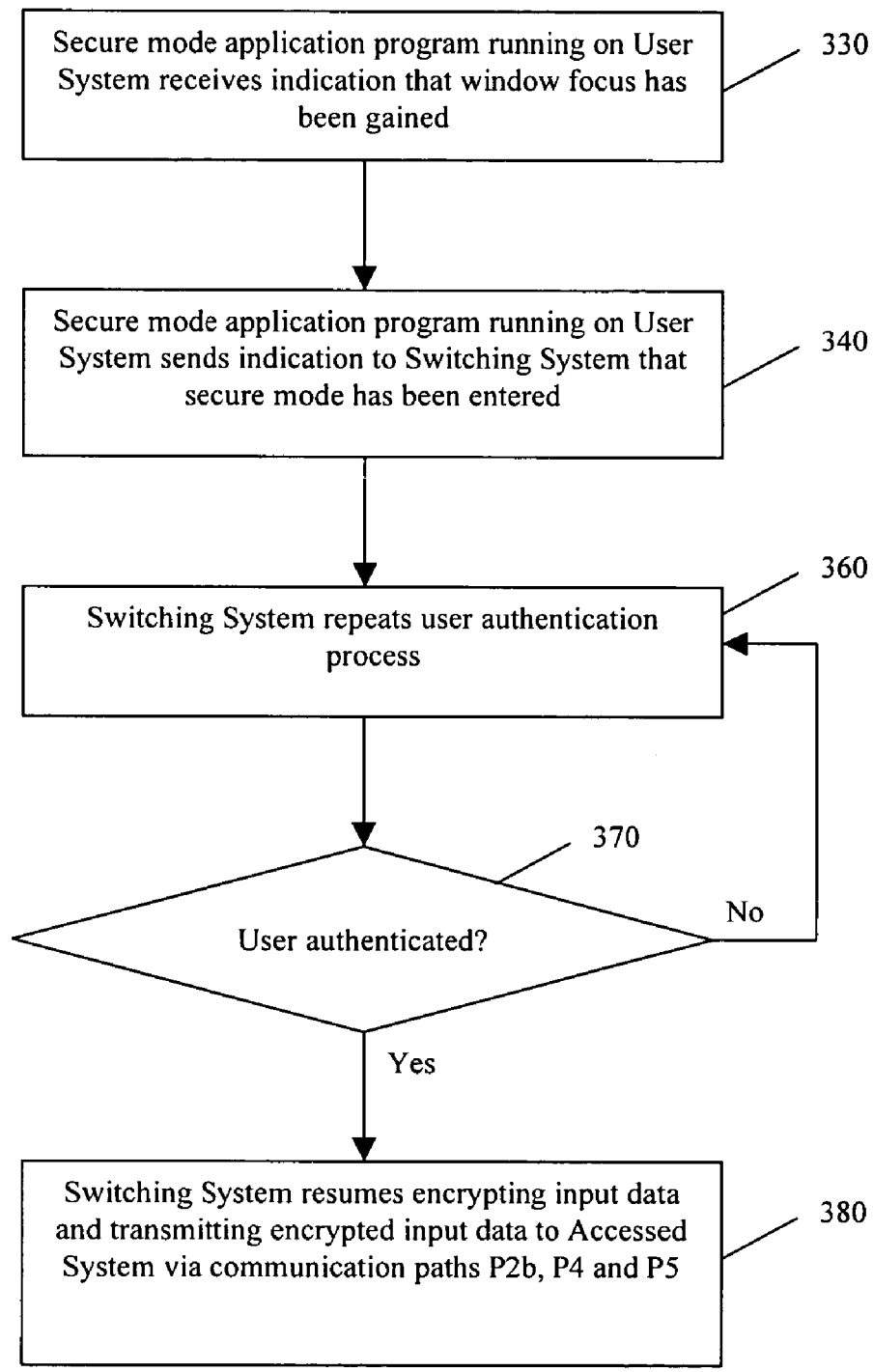

Another way in which the data communication system of the invention may operate when the secure mode application program is resumed at User Computer 108 is shown in the flow diagram of FIG. 7. The steps of FIG. 7 having the same reference numbers as steps of FIG. 6 are performed in the same manner as described above in connection with FIG. 6. In FIG. 7, after the secure mode application program receives the indication that it has gained window focus (step 330) and notifies Switching System 102 that secure mode has been entered (step 340), processing may continue with step 360 where, before entering secure mode, Switching System 102 attempts to again authenticate the user, e.g., in the same manner as previously described in connection with steps 209*a*, 209*b*, and 209*c* of FIG. 4A. At step 370, Switching System 102 determines whether the user has been authenticated. If this determination is negative, processing returns to step 360 where the user is again asked to authenticate himself/herself. If this determination is positive, then processing continues with step 380, as described above in connection with FIG. 6.

Figure 8:
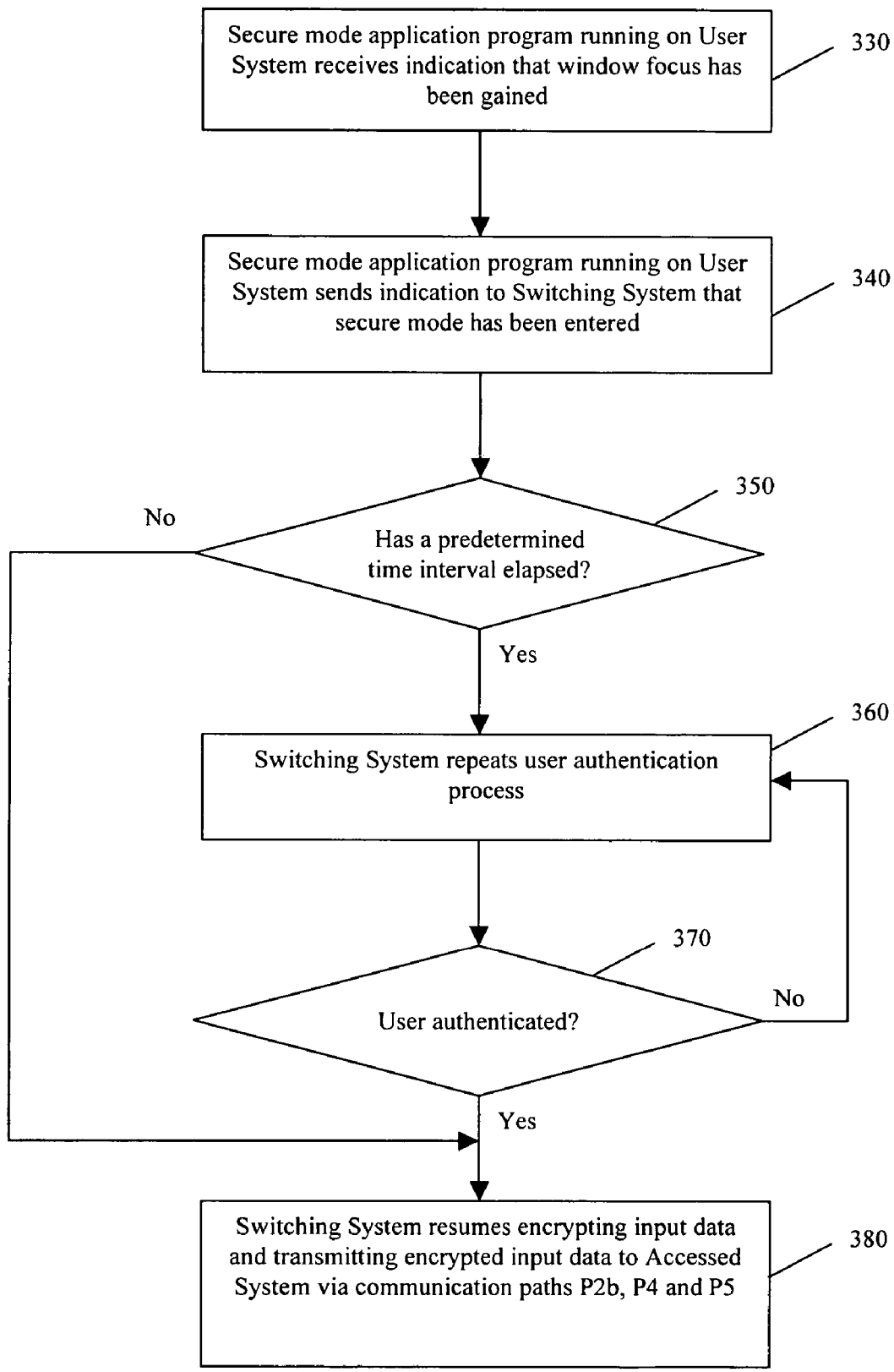

FIG. 8 shows a flow diagram illustrating another way in which the data communication system of the invention may operate when the secure mode application program is resumed at User Computer 108. The steps of FIG. 8 having the same reference numbers as steps of FIGS. 6 and 7 are performed in the same manner as described above in connection with those figures. In FIG. 8, after the secure mode application program receives the indication that it has gained window focus (step 330) and notifies Switching System 102 that secure mode has been entered (step 340), processing may continue with step 350 where, before entering secure mode, Switching System 102 determines whether a predetermined time interval has elapsed. This time interval may be set at the time of manufacture or configured by the user. If this determination is negative, then processing may continue with step 380. If this determination is positive, then Switching System 102 attempts to again authenticate the user prior to entering secure mode, as described above in connection with steps 360 and 370 of FIG. 7.

Figure 9:
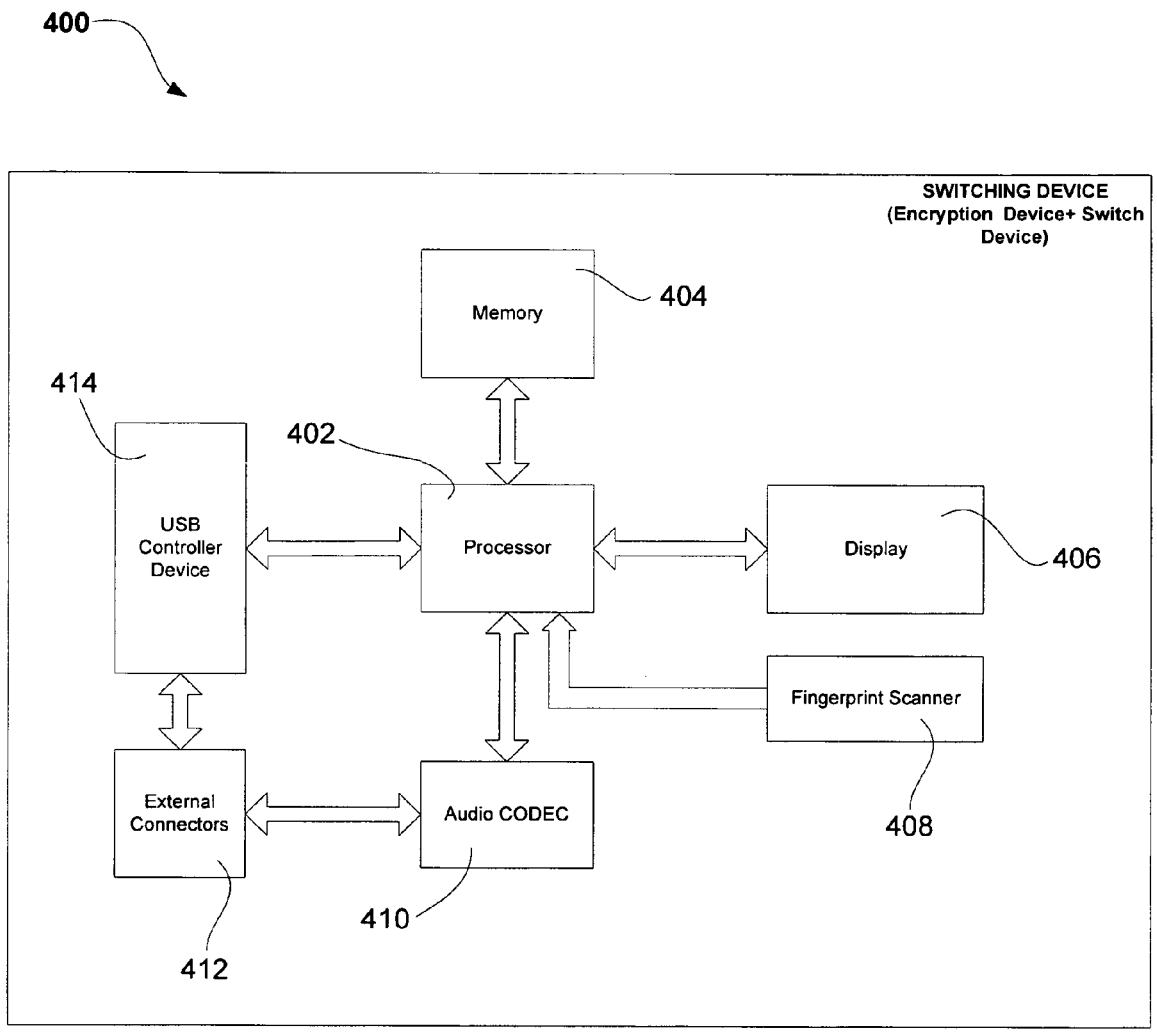
FIG. 9 is a block diagram illustrating the components of the switching system according to an embodiment of the present invention.

FIG. 9 is a block diagram illustrating the components of a Switching System according to an embodiment of the present invention. Switching System 400 comprises a processor 402 (e.g., the MC9328MXL offered by Freescale Semiconductor, Inc.), memory device 404 (e.g., PSRAM and flash memory), a display 406 (e.g., a color OLED display), a fingerprint scanner 408 (e.g., the FingerChip® AT77C104B offered by Atmel), an audio encoder/decoder 410 (e.g., the VS1002D offered by VLSI Solution Oy), external connectors 412, and a USB controller device 414 (e.g., the CYC67200 offered by Cypress Semiconductor Corp.). As discussed further below, the processor 402 performs the functions of the switching system mentioned above (e.g., switching, encryption, and decryption) based on programming stored in memory device 404. As discussed further below, Processor 402 also coordinates the activities of the other components of switching system 400. A control program (referred to as the Switching System Control Program or SSCP) also stored in memory device 404, controls the activities of Processor 402, as described further below.

Processor 402 includes a USB device module composite that is configured to enable Processor 402 to function as a USB device capable of a plurality of distinct functionalities. Each such functionality may be of a standard USB device class. For example, as described further below, once Processor 402 is connected to the USB host, this USB device module enables Processor 402 to be recognized (e.g., by the USB host) as and to function as a USB mass-storage device and a USB communication device (e.g., an Ethernet Emulation device).

Display 406 provides the user of the switching system with a display for receiving various prompts. For example, display 406 may prompt the user to place their forefinger on the finger print scanner 408 (e.g., "Place Forefinger on Scan Pad"). The display 406 may also provide the user with status information relating to the establishment of a connection between itself and the User Computer (e.g., "Connection Failure Detected").

Memory device 404 provides memory storage for the Switching System 400. As mentioned above, memory device 404 stores programming to be executed by Processor 402. Also memory device 404 may store scanned fingerprint data, various encryption/decryption program data, data buffering, control program data, and other data.

Fingerprint scanner 408 may comprise a fingerprint detection pad and scanner that generates data associated with a user's fingerprint (e.g., as stored in memory device 404). During authentication, the scanned fingerprint may be compared with an authentic copy of the user's fingerprint. Authentication may be considered complete when the authentic copy and scanned copy of the user's fingerprint are identical or in correlation.

Audio encoder/decoder 410 may provide the user with several audio related options. For example, voice data received from one of the external connectors 412 may be digitized and encoded by device 410 as a voice data file. The voice data may be stored in memory 404 and transmitted over a communication network to another computer device. It may also be directly transmitted to the remote location following the encoding process at device 410. The encoder/decoder 410 may also be utilized for processing stored (e.g., memory 404) or downloaded audio files (e.g., MP3 music files) for playback.

External connectors 412 may comprise USB sockets, a microphone input jack, and/or an audio output (e.g., headphone socket). For example, decoded audio music files stored in memory 404 may be output to a headphone jack.

Figure 10:
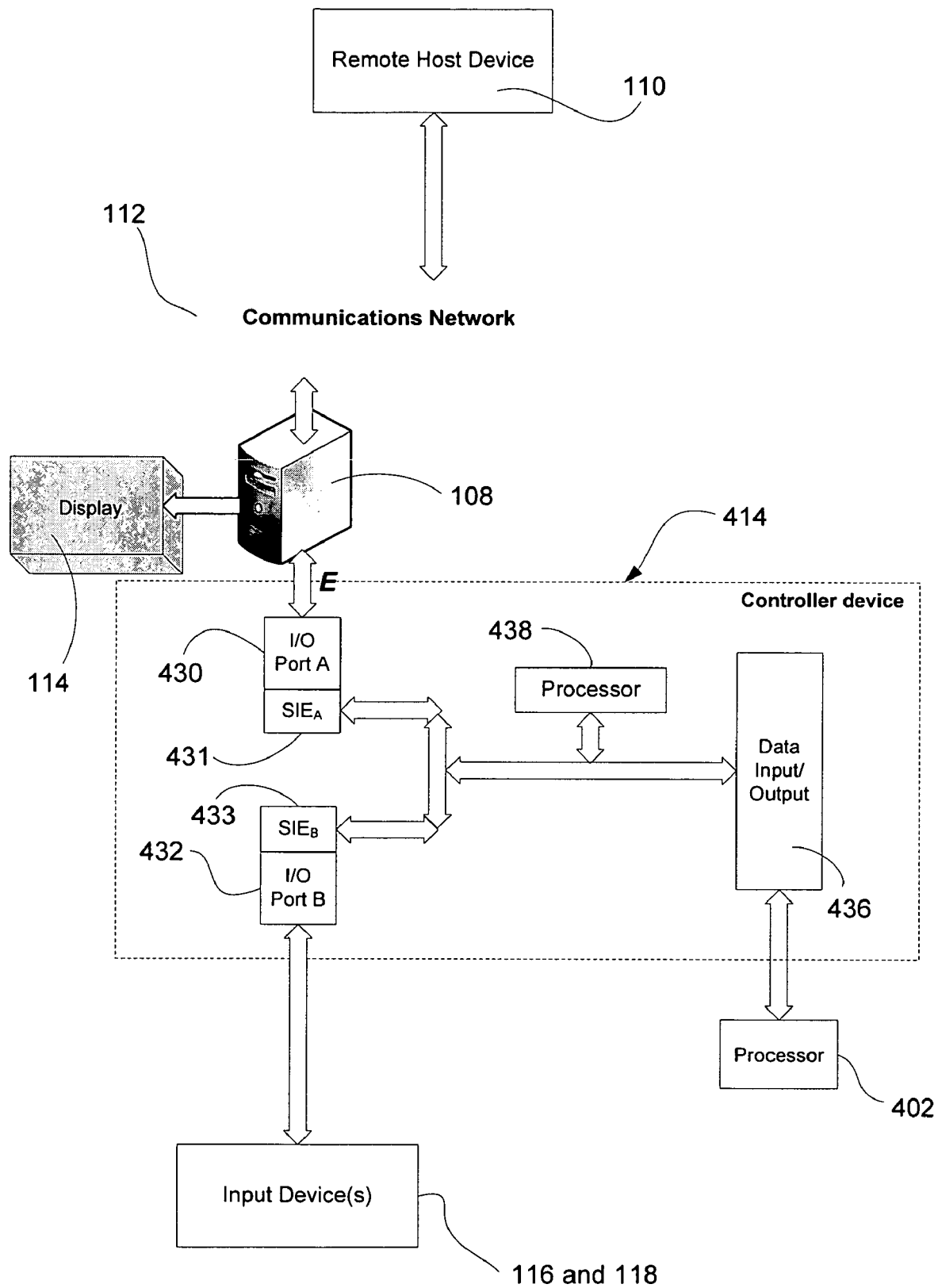
FIG. 10 is a block diagram of a USB controller device according to an embodiment of the present invention.

USB controller device 414 operates as a USB hub connecting Processor 402 and one or more input generating devices (e.g., mouse and, keyboard,) to User Computer 108 (FIG. 1). Detail of controller device 414 is shown in FIG. 10

Controller device 414 comprises a first USB port 430 with a corresponding Serial Interface Engine (SIE) 431, a second USB port 432 with a corresponding SIE 433, a General Purpose I/O (GPIO) interface 436, and a processor 438. USB port 430 provides connectivity between the controller 414 and User Computer 108. Similarly, USB port 432 connects input devices 116 and 118 (e.g., mouse and keyboard) to the controller device 414. Processor 402 communicates with controller device 414 via GPIO interface 436. Processor 402 both sends and receives data (e.g., input data, control data, and application data) to and from controller 414 via GPIO interface 436.

Switching System 400 may be further explained by referring back to FIGS. 4A through 6 above and elaborating on the flow diagrams therein in the context of Switching System 400. Referring to FIG. 4A, at step 202, the Switching System is connected to the User Computer and input devices. Once connected, User Computer 108 (which includes a USB host system in this embodiment) recognizes Switching System 400 as a USB hub to which a composite USB device (comprising a USB mass-storage device function and a USB Ethernet emulation device function, as mentioned above) is attached. User Computer 108 also recognizes input devices 116 and 118 as USB input devices attached to this hub. Once Switching System 400 is connected, the Switching System Control Program (SSCP) is initiated at processor 402.

In addition, once Switching System 400 is connected, multiple logical communication channels are established, e.g., one or more USB pipes corresponding to each USB device. In the context of Switching System 400, logical communication paths P2*a* and P2*b*, mentioned above, correspond to all channels associated with Human Interface Device (HID) class devices (e.g., input devices 116 and 118) and to the channels associated with the Ethernet emulation device function, respectively.

When first connected, the Switching System 400 operates in un-secure mode. In this mode, processor 438 of the USB controller instructs SIE 433 to route data it receives from I/O port 432 (e.g., input data received from input devices 116 and 118 connected to I/O port 432) to SIE 431 which sends this data through I/O port 430 to the USB host system at User Computer 108.

At step 204, the secure mode application program to be executed on User Computer 108 is launched. As mentioned above, this application program may be stored in the memory device 404 of Switching System 400. As such, the application program would be presented (e.g., by the file system of the operating system of User Computer 108) to the user as an executable file stored in the USB mass storage device. The user at User Computer 108 may then launch the application program in a conventional manner associated with the operating system of User Computer 108 (e.g., double-clicking on an icon representing the file corresponding to the application program).

At step 206, the secure mode application program running on the User Computer determines whether the Switching System is connected. This may be accomplished by the secure mode application program making a query as to the presence of the Switching System 102 (FIG. 3) via a USB controller incorporated within the switching device 104 (FIG. 3). The application program is in communication with the remote system 110 (FIG. 3) during the connection and authentication processes associated with switching system 102 (FIG. 3).

After the secure mode application program running on the User Computer prompts the user to authenticate themselves using the Switching System (step 208), the Switching System attempts to authenticate the user according to steps 209*a*, 209*b*, and 209*c*. This may be accomplished by the Switching System Control Program launching an authentication program stored in memory device 404 to cause processor 402 to perform the steps of 209*a*, 209*b*, and 209*c* in the manner described previously with processor 402 using display 406 to prompt the user and using fingerprint scanner 408 to obtain fingerprint data from the user.

At step 212, the Switching System informs the secure mode application program running on the User Computer that the user has been authenticated. This may be accomplished by the Switching System Control Program sending an indication to the secure mode application program running on User Computer 108.

At step 214, the secure mode application running on the User Computer requests that secure mode be initiated. This may be accomplished by the secure mode application running on User Computer 108 sending an indication to the Switching System Control Program over USB (i.e., link P2).

Upon receiving this request to initiate secure mode, the Switching System Control Program sends an instruction via GPIO interface 436 to the USB controller processor 438 commanding it to go into secure mode. USB controller processor 438 then instructs SIE 433 to stop routing data to SIE 431 and instead to route data from USB port 432 to processor 402 via the GPIO interface 436. This routing change is accomplished without changing the USB status of the input devices connected to I/O port 432. Consequently, to the USB host system at User Computer 108, the USB input devices (e.g., mouse 116 and keyboard 118) appear to be connected and fully operational even though, for the duration of secure mode, data from them will be prevented from flowing upstream to the USB host system.

If desired, USB controller processor 438 may be configured so that it will recognize the command to go into secure mode only if the command is received over a particular communication path, e.g., GPIO interface 436. This is advantageous in that it increases the likelihood that the command to enter secure mode is received from processor 402 as opposed to a rogue program residing on the User Computer.

Referring now to FIG. 4B, at step 216, input data is received by the Switching System and routed to the encryption device for encryption. In the context of Switching System 400, during secure mode, data from input devices 116 and 118 is received through I/O port 432 by SIE 433 and routed over GPIO 436 to processor 402. The Switching System Control Program running on processor 402 then executes an encryption program from memory device 404 to encrypt the data.

At step 220, the Switching System formats the encrypted data as a network packet and sends it to the User Computer. In the context of Switching System 400 (FIG. 9), the Switching System Control Program receives the encrypted data from the encryption program and instructs the USB Ethernet emulation device class function to send the encrypted data to the IP address of Accessed Computer 110. Allocation of the IP address to which the encrypted data is sent is carried out by the Dynamic Host Control Protocol (DHCP) at the remote Accessed System 110 (FIG. 3). The USB Ethernet emulation device class function formats the encrypted data according to the Ethernet protocol and encapsulates this Ethernet packet as USB data and sends this USB over Ethernet packet (containing the encrypted input data) to the USB host system of User Computer 108.

At step 222, the network packet is sent to the secure mode application program running on the Accessed Computer. In the context of the embodiment involving Switching System 400, the USB host system of User Computer 108, upon receiving the Ethernet packet passes it onto the network interface of User Computer 108 for transmission over Network 112 to Accessed Computer 110.

After Accessed Computer 110 receives the Ethernet packet (step 224), it decrypts and processes the encrypted input data contained therein to generate a response, encrypts the response, and transmits the encrypted response to the Switching System (step 226).

At step 228, this encrypted response is received and decrypted by the Switching System and sent to the application program running on the User Computer for action. In the context of the embodiment of the invention involving Switching System 400, an Ethernet packet containing the encrypted response from Accessed Computer 110 arrives at the network interface of User Computer 108. Since this Ethernet packet is addressed to the USB Ethernet emulation device class function of Switching System 400, the Ethernet packet is passed to the USB host system of User Computer 108, which wraps this Ethernet packet in a USB packet for transport over the USB. This USB packet is received at SIE 431 and routed to the USB Ethernet emulation device class function running on processor 402 via GPIO interface 436. At processor 402, the USB Ethernet emulation device class function extracts the encrypted response data from the Ethernet packet and passes it to the Switching System Control Program which launches a decryption program from memory device 404 to decrypt the response. The Switching System Control Program then sends this decrypted response data to the secure mode application program running on User Computer 108. Communication between the Switching System Control Program and the secure mode application program running on User Computer 108 is over USB. The secure mode application program running on User Computer 108 sees the Switching System as a USB Ethernet device and communicates with it via an Ethernet over USB interface.

As mentioned above, FIGS. 5 and 6 describe the effects of different applications running on User Computer 108 becoming active on the secure mode of operation according to an embodiment of the present invention. As mentioned previously, FIG. 5 is a flow diagram showing one way in which the data communication system of the invention may operate when the secure mode application program running on User Computer 108 stops being the active application. Referring to FIG. 5, the secure mode application program running on User Computer 108 receives an indication that window focus has been lost (step 300). Then, at step 310, the secure mode application program running on User Computer 108 sends an indication to Switching System 102 that secure mode has been exited. In the context of the embodiment of the invention involving Switching System 102, this may be accomplished by the secure mode application program sending an indication to the Switching System Control Program that secure mode has been exited. This may be achieved via USB's endpoint communication channel, where Switching System 102 (i.e., endpoint device) is identified as an Ethernet device by the USB driver interface User Computer 108 (i.e., USB host device).

At step 320, the Switching System allows input data to from the input devices to flow through communication path P2a to the User Computer unencrypted. In the context of Switching System 400, sends an instruction via GPIO interface 436 to the USB controller processor 438 commanding it to enter un-secure mode. USB controller processor 438 then instructs SIE 433 to route data it receives from I/O port 432 to SIE 431 which sends this data through I/O port 430 to the USB host system at User Computer 108.

As mentioned previously, FIG. 6 is a flow diagram showing one way in which the data communication system of the invention may operate when the secure mode application program is resumed at User Computer 108. Referring to FIG. 6, after the secure mode application program running on User Computer 108 receives an indication that window focus has been gained (step 330), it sends an indication to the Switching System that secure mode has been entered (step 340). In the context of the embodiment of the invention involving Switching System 400, this latter step may be accomplished by the secure mode application program sending an indication to the Switching System Control Program that secure mode has been entered.

Then, at step 380, the Switching System routes input data from the input devices to the encryption device for encryption and then sends the encrypted input data up through communication path P2b to the User Computer for transmission to the Accessed Computer. In the context of Switching System 400, this may be accomplished by the Switching System Control Program sending an instruction via GPIO interface 436 to the USB controller processor 438 commanding it to go into secure mode. USB controller processor 438 then instructs SIE 433 to stop routing data to SIE 431 and instead to route data from USB port 432 to processor 402 via the GPIO interface 436. Input data from input devices 116 and 118 are then routed to the Switching System Control Program for encryption and sent to Accessed Computer 110 in the same manner as described above.

Figure 11A:
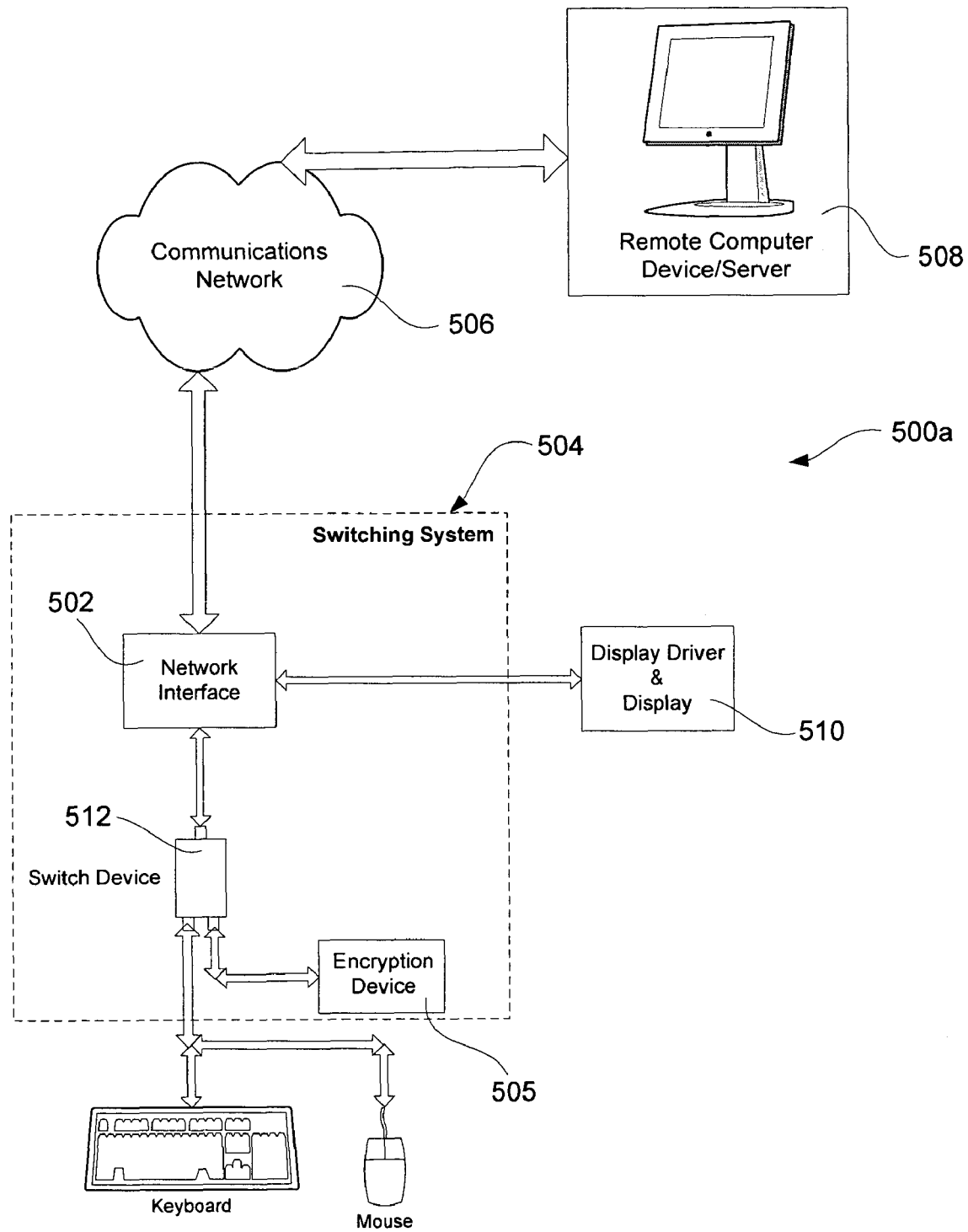
FIGS. 11A and 11B are system block diagrams illustrating alternative embodiments of systems incorporating the switching system according to an embodiment of the present invention.
Figure 11B:
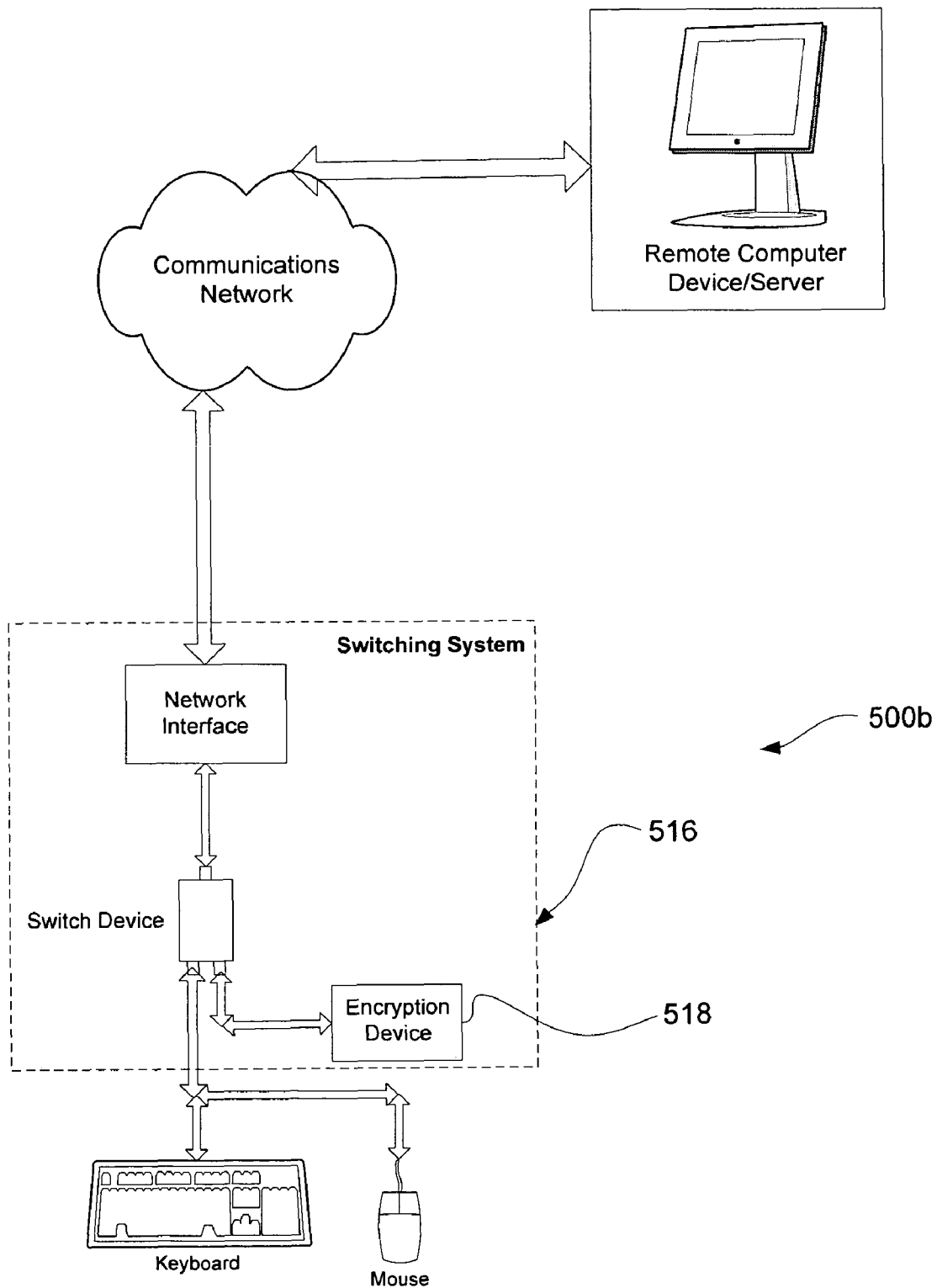

FIGS. 11A and 11B illustrate alternative embodiments of systems incorporating switching system 102 (FIG. 3). In FIG. 11A, a network interface 502 ordinarily incorporated within a computer (e.g., computer 108 shown in FIG. 3) may be integrated into switching system 504. In this embodiment, encrypted data is directly sent over the network 506 to the server or remote computer 508 for processing. If the device 504 is utilized for accessing another website having no encryption/decryption and/or authentication requirements, it will function in non-secure mode. In non-secure mode, the data received from another site by interface 502 may be routed by switch device 512 to encryption device 505. At the encryption device 505, the received data may be processed (without encryption/decryption) by the encryption device and sent to display device 510 via switch 512. For example, encryption device 505 may include an Internet browser program for providing Internet access. Accessed web page data is sent from a remote server (e.g., computer 508) over communications network 506 to switching system 504, where the data is received by interface 502. From interface 502, the received web page data is routed by switch 512 to encryption device 505. The web page data is then processed by the browser program running on encryption device 505 prior to being routed by switch 512 to the display device 510.

If, however, the device 504 is used in secure mode, once encryption device 505 decrypts the encrypted data received from remote computer 508, the received decrypted data may be displayed on display device 510. Display device 510 may comprise a display driver (e.g., VGA card) and monitor, which is connected to security device 504. In FIG. 11B, the security device 516 is identical to that of security device 504 (FIG. 11A), except that device 516 (FIG. 11B) comprises an integrated display device. The integrated display device may be incorporated within the encryption device 518 (also see FIG. 4, display 406). Alternatively, a dedicated display device may be attached directly to the security device 516. Both security devices 504 and 516 illustrated in FIGS. 11A and 11B, respectively, may comprise a plurality of display drivers for use with use with different external display devices. Each device 504, 516 may therefore incorporate one or more external connectors for supporting connectivity to these display devices.

While the invention has been described and illustrated in connection with preferred embodiments, many variations and modifications as will be evident to those skilled in this art may be made without departing from the spirit and scope of the invention, and the invention is thus not be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures, is implied. In many cases the order of process steps may be varied without changing the purpose, effect or import of the methods described.

What is claimed is:

1. A method for communicating data for use in a first computer, comprising:
    in a first communication mode selected at the first computer, the first computer receiving data provided by one or more input devices associated with the first computer for use by the first computer in an application program executing in the first computer, the first computer displaying received data on one or more display devices associated with the first computer;
    in a second communication mode selected at the first computer, a second computer receiving data provided by the one or more input devices via a switch device without the first computer processing or displaying the data provided by the one or more input devices for use by the second computer in another application program executing on the second computer;
    the another application program executing in the second computer generating response data in response to the data received by the second computer;
    the switch device being configured to provide the response data from the second computer to the first computer while the second communication mode is selected at the first computer; and
    the first computer receiving via the switch device the response data generated by the second computer and displaying received response data on the one or more display devices while the second communication mode is selected at the first computer.

2. The method of claim 1, wherein the first computer sends a first indication associated with the first communication mode being selected in response to a user activating the application program executing in the first computer; and
    wherein the first computer sends a second indication associated with the second communication mode being selected in response to the user activating a second application program executing in the first computer.

3. The method of claim 1, wherein receiving the data at the second computer comprises receiving the data at the second computer using a network interface of the first computer, and wherein receiving the response data comprises receiving from the network interface of the first computer a reply to the received data provided by the one or more input devices from the second computer.

4. The method of claim 3, wherein the received reply from the second computer is encrypted, and wherein receiving the reply at the first computer comprises:
    decrypting the received reply; and
    transmitting the decrypted reply to the first computer.

5. The method of claim 1, wherein receiving the data provided by the one or more input devices at the second computer comprises:
    encrypting the data provided by the one or more input devices; and
    receiving the encrypted data at the second computer.

6. A method of providing data communication over a communication network using an encryption device, the method comprising:
    if (a) a secure communications mode is selected:
    providing data from one or more input devices to the encryption device via a switch device;
        the encryption device encrypting the data;
        providing the encrypted data via the switch device to an interface associated with a first computer for transmission to a second computer;
        sending the encrypted data to the second computer without the first computer processing or displaying the encrypted data or the data provided from the one or more input devices;
        decrypting at the second computer the encrypted data and generating encrypted response data;
        sending the encrypted response data generated by the second computer to the interface associated with the first computer;
        the interface providing the encrypted response data via the switch device to the encryption device;
        the encryption device decrypting the encrypted response data and providing decrypted response data;
        providing the decrypted response data to the switch device, the switch device being configured to provide the response data from the second computer to the first computer while the secure communications mode is selected at the first computer; and
        the first computer performing an operation based on the decrypted response data;
    else (b) providing data from the one or more input devices to the first computer without encryption for use by the first computer, wherein the first computer causes the data provided by the one or more input devices to be displayed on one or more display devices associated with the first computer, and in the secure communications mode the first computer causes the decrypted response data to be displayed by the one or more display devices.

7. The method according to claim 6, comprising authenticating a user in the secure communications mode.

8. The method according to claim 7, wherein the authenticating comprises launching an application program which provides connection status between the encryption device and the first computer.

9. The method according to claim 7, wherein the authenticating comprises scanning and detecting a finger print pattern associated with the user in response to a prompt generated by the application program which is displayed on a display device associated either with the encryption device or the first computer.

10. The method according to claim 6, wherein the decrypted response data comprises display data which the second computer displays on a display device associated therewith.

11. The method of claim 6, wherein the interface comprises a universal serial bus (USB) interface and a network interface.

12. The method according to claim 6, wherein the one or more input devices comprises a keyboard device.

13. The method according to claim 6, wherein the one or more input devices comprises a mouse device.

14. The method according to claim 6, wherein the one or more input devices comprises a peripheral device.

15. A method of providing data communication between a first computer and a second computer over a communication network using an encryption device coupled to the first computer, the method comprising:
if (a) a first application program associated with the first computer is active:
providing data from one or more input devices via a switch device to the encryption device;
the encryption device encrypting the data;
providing the encrypted data via the switch device to an interface associated with the first computer for transmission to the second computer;
sending the encrypted data to the second computer without the first computer processing or displaying the encrypted data or the data provided from the one or more input devices;
decrypting at the second computer the encrypted data and generating encrypted response data;
sending the encrypted response data generated by the second computer to the interface associated with the first computer;
the interface providing the encrypted response data via the switch device to the encryption device;
the encryption device decrypting the encrypted response data; and
the encryption device providing the decrypted response data to the switch device, and while the first application program associated with the first computer is active the switch device being configured to provide the response data to the first application program operating in the encryption device or to the first computer for operation by the first application program operating in the first computer;
else (b) providing data from the one or more input devices to the first computer without encryption for use by the first computer in a program other than the first application program, wherein the first computer causes the data provided by the one or more input devices to be displayed on one or more display devices associated with the first computer, and when the first application program is active the first computer causes the decrypted response data to be displayed by the one or more display devices.

16. The method according to claim 15, wherein the one or more input devices comprises a keyboard device.

17. The method according to claim 15, wherein the one or more input devices comprises a mouse device.

18. The method according to claim 15, wherein the one or more input devices comprises a peripheral device.

19. The method according to claim 15, wherein the first application program resides on the first computer and communicates with the another application program residing on the second computer, wherein the another application generates the response data and the first application program at the first computer displays the decrypted response data on the one or more display devices associated with the first computer.

20. The method according to claim 15, wherein the first application program resides on the encryption device and communicates with the another application program, wherein the another application generates the response data and the first application program at the encryption device displays the decrypted response data on the one or more display devices associated with the first computer or on a display device associated with the encryption device.

21. The method according to claim 15, wherein the communication network comprises the Internet.

22. The method according to claim 15, wherein the first application program is active in the first computer when data provided by the first application program is in-focus on a display device associated with the first computer.

23. A system for providing secure data transmission over a communication network between a first computer and a second computer, the system comprising:
a switch device;
an encryption device;
a first computer configured to run a first application program and a second application program;
an interface associated with the first computer; and
a second computer;
the switch device being adapted to receive data from one or more input devices and being configurable to route the data to the encryption device when the switch is in a secure communications mode and to the first computer when the switch device is not in a secure communications mode;
the first computer being configured to receive the data from the switch device and use the data in the first application program when the switch device is not in the secure communications mode;
the encryption device being configured to receive the data from the switch device when the switch device is in the secure communications mode, and to encrypt received data;
the interface associated with the first computer being configured to receive the encrypted data when the switch is in the secure communications mode and to send the encrypted data over the communication network to the second computer without processing or display by the first computer of the encrypted data or the data received from the one or more input devices;
the second computer being configured to receive the encrypted data, automatically generating encrypted response data and send the encrypted response data to the interface;
the interface being configured to provide the encrypted response data generated by the second computer to the switch;
the switch being configured to provide the encrypted response data to the encryption device;
the encryption device being configured to decrypt the encrypted response data and provide decrypted response data to the switch device, the switch being configured to provide the decrypted response data to the first computer while the switch device is in the secure communications mode; and
the first computer being configured to use the decrypted response data in the second application program and provide display data to one or more display devices associated with the first computer, and the first computer being configured to display the data used in the first application program when the switch device is not in the secure communications on the one or more display devices associated with the first computer.

24. The system according to claim 23, wherein the interface comprises a network interface.

25. The system according to claim 23, further comprising a biometric authentication device associated with the encryption device which cooperate to authenticate a user, the encryption device being configured to encrypt data from the switch device only after the user is authenticated.

26. The system according to claim 25, wherein the biometric authentication device comprises a fingerprint scanner.

27. The system according to claim 23, wherein the switch device comprises a USB controller for providing switching of data from the one or more input devices to the first computer and to the encryption device.

28. A method of providing security to an application program in communication with a server computer that receives input from an input device operating with a client computer and displays information on one or more display devices operating with the client computer, the method comprising:
  if (a) a secure communications mode is selected:
    encrypting data entered via the input device without providing the entered, unencrypted data to the client computer;
    transmitting the encrypted data via a switch device over a network to the server computer without the first computer processing or displaying the unencrypted or encrypted data, wherein the server computer includes a server application program;
    decrypting the encrypted data at the server computer;
    the server computer using the server application program and the decrypted data and generating response data;
    transmitting the response data generated by the server computer to the client computer via the switch device, wherein the switch device provides the response data to the client computer while the secure communications mode is selected, for use by a first application program; and
    the client computer and the first application program causing the one or more display devices to display the response data;
  else (b) providing the data entered via the input device to the client computer without encryption for use in an application other than the first application program, wherein the client computer causes the data entered by the input device operating with the client computer to be displayed on the one or more display devices.

29. The method according to claim 28, comprising encrypting the response data at the server computer and transmitting encrypted response data to the client computer, and decrypting at the client computer the encrypted response data.

30. The method according to claim 29, wherein encrypted response data transmitted to the client computer is decrypted independently of the client computer and such decrypted response data is provided to the client computer for display on the one or more display devices.

31. The method according to claim 28, wherein the input device comprises a keyboard.

32. The method according to claim 28, wherein the input device comprises a pointing device.

33. A method for a client computer to interact with a plurality of application programs and to provide security to at least one application program of the plurality of application programs, the client computer communicating with a server computer and receiving input from an input device, the method comprising:
  if the at least one application program includes a window in focus at the client computer on one or more display devices associated with the client computer:
    encrypting data relating to the at least one application program entered via the input device without providing the entered, unencrypted data to the client computer;
    transmitting the encrypted data via a switch device over a network to the server computer without the first computer processing or displaying the unencrypted or encrypted data;
    decrypting the encrypted data at the server computer;
    the server computer operating on the decrypted data and generating data to be operated on by the client computer;
    transmitting the data generated by the server computer to the client computer via the switch device, wherein the switch device provides the response data to the client computer while the window is in focus; and
    the client computer operating on the generated data;
  else providing data entered via the input device to the client computer without encryption for disposition by the client computer, wherein the first computer causes the data received from the input devices to be displayed on one or more display devices associated with the first computer, and when the window is in focus the first computer causes the decrypted data to be displayed by the one or more display devices.

34. The method of claim 33, comprising encrypting data relating to the at least one application program which includes the in-focus window in a device coupled to and between the input device and the client computer.

* * * * *